US009883327B2

(12) United States Patent
Anderson (10) Patent No.: US 9,883,327 B2
(45) Date of Patent: Jan. 30, 2018

(54) SELECTION OF A CREDENTIAL FOR A TARGET DEVICE TO PERFORM NEXT STATE

(71) Applicant: HEWLETT-PACKARD DEVELOPMENT COMPANY, L.P., Houston, TX (US)

(72) Inventor: Paul Michael Anderson, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/768,853

(22) PCT Filed: Feb. 27, 2013

(86) PCT No.: PCT/US2013/028012
§ 371 (c)(1),
(2) Date: Aug. 19, 2015

(87) PCT Pub. No.: WO2014/133503
PCT Pub. Date: Sep. 4, 2014

(65) Prior Publication Data
US 2016/0007142 A1    Jan. 7, 2016

(51) Int. Cl.
*H04W 4/00* (2009.01)
*H04W 12/06* (2009.01)
(Continued)

(52) U.S. Cl.
CPC .......... *H04W 4/008* (2013.01); *H04B 5/0031* (2013.01); *H04L 67/24* (2013.01);
(Continued)

(58) Field of Classification Search
USPC ..... 340/10.1, 13.24, 13.25, 13.26, 10.5, 4.3; 455/41.1, 41.2, 39, 41.3; 726/1, 2, 5, 6,
(Continued)

(56) References Cited

U.S. PATENT DOCUMENTS 8,321,922 B1    11/2012 Lo et al.
2006/0044153 A1*  3/2006 Dawidowsky ..... G06K 19/0723
340/4.3
(Continued)

FOREIGN PATENT DOCUMENTS

EP    2541978 A1    1/2013

OTHER PUBLICATIONS

HID Global's top 10 access control trends for 2013, (Web Page), Dec. 19, 2012.6 pps., http://www.nfcnews.com/2012/12/19/hid-globals-top-10-access-control-trends-for-2013?tag=Government_ID.
(Continued)

*Primary Examiner* — Nay A Maung
*Assistant Examiner* — Erica Fleming-Hall
(74) *Attorney, Agent, or Firm* — HP Inc. Patent Department (57) ABSTRACT

Examples disclose a method, executed by a computing device, to obtain an identifier and system state of a target device for establishing a near field communication link. Additionally, the examples disclose the method processes the system state of the target device according to a rules engine to determine a next action for the target device. Also, the examples disclose the method selects a credential associated with the identifier of the target device and transmits the selected credential to the target device.

12 Claims, 5 Drawing Sheets

(51) Int. Cl.
*H04W 76/02* (2009.01)
*H04B 5/00* (2006.01)
*H04L 29/08* (2006.01)
*H04L 29/06* (2006.01)

(52) U.S. Cl.
CPC .......... *H04W 12/06* (2013.01); *H04W 76/02* (2013.01); *H04L 63/0853* (2013.01)

(58) Field of Classification Search
USPC ........................................ 726/17, 18, 19, 20
See application file for complete search history.

(56) References Cited

U.S. PATENT DOCUMENTS

| | | | |
|---|---|---|---|
| 2006/0165060 A1 | 7/2006 | Dua | |
| 2006/0183462 A1 | 8/2006 | Kolehmainen | |
| 2007/0047568 A1* | 3/2007 | Wang | G06Q 10/087 370/429 |
| 2007/0182565 A1* | 8/2007 | Lee | G06K 19/07703 340/572.8 |
| 2007/0194945 A1 | 8/2007 | Atkinson | |
| 2007/0222597 A1* | 9/2007 | Tourrilhes | G06Q 10/06 340/572.1 |
| 2008/0270814 A1* | 10/2008 | Starr | G06F 1/3203 713/323 |
| 2010/0179850 A1* | 7/2010 | Fuller | G05B 15/02 705/7.12 |
| 2011/0185008 A1 | 7/2011 | Le et al. | |
| 2013/0029596 A1* | 1/2013 | Preston | H04L 63/18 455/41.1 |
| 2013/0095751 A1* | 4/2013 | Kasslin | H04W 12/12 455/41.1 |
| 2013/0127599 A1* | 5/2013 | Foster | G05B 19/048 340/10.5 |
| 2013/0145420 A1* | 6/2013 | Ting | H04L 63/08 726/1 |
| 2013/0196590 A1* | 8/2013 | Fyke | H04W 8/24 455/3.01 |
| 2014/0122396 A1* | 5/2014 | Swaminathan | G06N 99/005 706/14 |
| 2014/0292498 A1* | 10/2014 | Hosoya | G06Q 10/00 340/10.51 |

OTHER PUBLICATIONS

International Search Report, dated Oct. 31, 2013, Application No. PCT/US2013/028012.
Neisse, Ricardo et al., An Hierarchical Policy-Based Architecture for Integrated Management of Grids and Networks, IEEE. 2004. See abstract; second page, left col., lines 1-13; third page, right col., lines 1-18.

* cited by examiner

SELECTION OF A CREDENTIAL FOR A TARGET DEVICE TO PERFORM NEXT STATE

BACKGROUND

Near field communication is a set of standards for computing devices to establish communication with each other. The communication between the devices is established by bringing the devices within close proximity of one another.

BRIEF DESCRIPTION OF THE DRAWINGS

In the accompanying drawings, like numerals refer to like components or blocks. The following detailed description references the drawings, wherein.

DETAILED DESCRIPTION

Users often interact with various computing devices by establishing a near field communication link; however, each of the various computing devices are each associated with a different credential. The different credentials may become cumbersome and inconvenient, as the user may manually select the appropriate credential for a given device. This also results in diminished efficiency as the communication link may not be established until the user selects the appropriate credential.

To address these issues, examples disclosed herein provide a method to automatically select a credential based on a state of a target device. A target device, as described herein, refers to the various computing devices a user may desire to establish a near field communication link. A state or system state of the target device, as described herein, refers to a current status of the target device with respect to an initiating computing device. The method processes the system state of the target device according to a rules engine to determine a next action for the target device to perform. The next action is a desired state for the target device to perform based on the system state, the rules engine enables the system state to move to the next logical action. For example, the system state may include the computing device currently logged out of the target device, the next action may include logging the computing device into the target device. Based on the next action, the computing device obtains an identifier of the target device and selects the credential associated with the identifier. This provides the ability for the components in the computing device to know the states of the devices in use and automatically initiate a. desired action using the appropriate credential. Further, this simplifies the near field communication experience for the user as examples provide a method to automatically select an appropriate credential for transmission without user input.

In another example, the credential is selected from multiple credentials, each credential specific to a different target device. Selecting the appropriate credential from multiple credentials provides another level of convenience of managing multiple credentials, each corresponding to a given target device.

In summary, examples disclosed herein simplify the near field communication experience for a user by automatically selecting an appropriate credential for a given target device without user input. Additionally, the examples also manage multiple credentials corresponding to various target devices.

Figure 1:
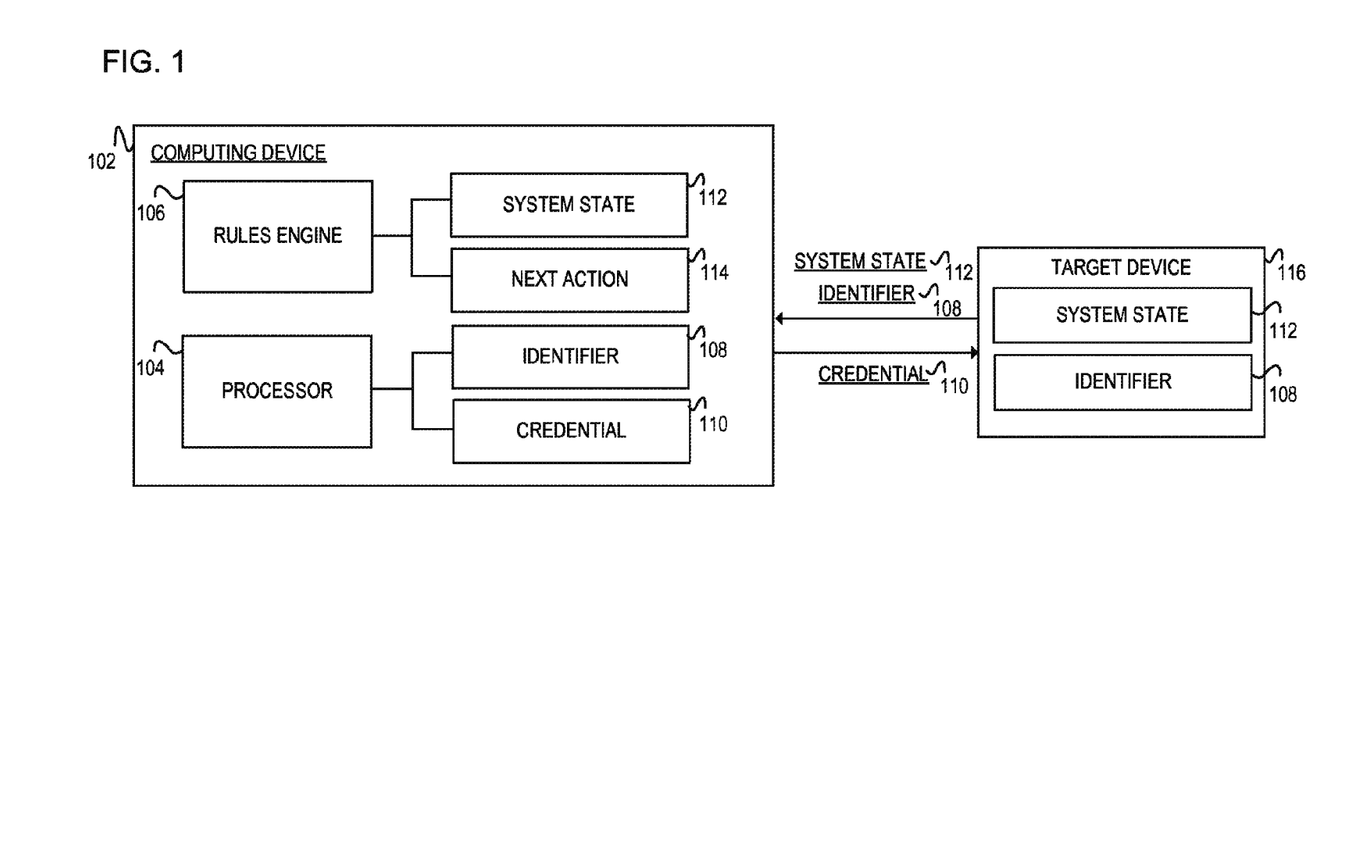
FIG. 1 is a block diagram of an example computing device with a processor to receive an identifier of a target device and to select a credential based on the identifier, the computing device further includes a rules engine to receive a state of the target device and determines the next state for the target device to perform based on a validation of the selected credential.

Referring now to the figures, FIG. 1 is a block diagram of an example computing device 102 to establish a near field communication link with a target device 116. The computing device 102 includes a rules engine 106 to receive a system state 112 of the target device 116 and determine a next action 114. The computing device 102 further includes a processor 104 to receive an identifier 108 based on the next action 114 and select a credential 110 for transmission to the target device 116 for validation. The target device 116 validates the selected credential 110 to perform the next action 114. Examples of the computing device 102 and the target device 116 should not be limited to the components illustrated in FIG. 1 as the computing device 102 and the target device 116 are each capable of near field communication. As such, each device 102 and/or may include the near field components, such as a chipset and/or antenna (not pictured). he computing device 102 is also considered an initiating or originating device as the computing device 102 may initiate the near field communication link with the target device 116 by transmitting a query to the target device 116 for the system state 112 and the identifier 108. Implementations of the computing device 102 include a client device, personal computer, desktop computer, laptop, a mobile device, or other type of electronic device suitable to receive the system state 112 and identifier 108 and transmit the selected credential 110.

The rules engine 106 obtains the system state 112 of the target device 116 to determine the next action 114. The rules engine 106 is a state model so when inputting a given state, the rules engine 106 will output the next logical state or next action 114. In this manner, the rules engine 106 moves logically from one state to another. The rules engine 106 may include a set of instructions, instruction, process, logic, algorithm, technique, logical function, firmware and/or software executable by the computing device 102 to determine the next logical action 114 based on the present status of the target device 116 with respect to the computing device 102.

The system state 112 is a current status of the target device 116 with respect to the computing device 102. For example, the system state 112 may include whether the computing device 102 is currently logged into or currently logged out of the target device 116. Logging into the target device 116 allows the computing device 102 to perform various tasks on an operating system of the target device 116. In another example, the system state 112 may indicate the capability of transferring or receiving data with the computing device 102. In this example, upon validation of the credential 110, the target device 116 may transfer data between the computing device 102 and the target device 116. In a further example, the system state 112 may include an image transferred to the target device 116. In this example, the target device 116 may be a near field communication enabled device and as such, upon validation of the credential 110, the target device 116 may print the image from the computing device 102. Obtaining the current status of the target device 116 with respect to the computing device 102 enables the device 102 to determine the next logical action 114 to perform on the target device 116. Implementations of the system state 112 include data information indicating the current state of the target device 116 for transmission to the computing device 102.

The next action 114 is considered a. future action of the target device 116 to perform with respect to the computing device 102. The next action 114 is considered the next logical action for the target device 116 to perform based upon the system state 112. For example, assume the computing device 102 is currently logged out of the target device 116, the next action may include logging the computing device 102 into the target device 116. Logging into the target device 116 enables the computing device 102 access to resources on the computing device 102. In another example, assume the target device 116 is ready to transfer or receive data, the next action 114 of the computing device 102 may include transferring the data image to the target device 116. In one implementation, based on the next action 114, the computing device 102 may query for the identifier 108 of the target device 116. In this implementation, the system state 112 and the identifier 108 are transmitted separately from one another. This implementation is explained in detail in FIG. 2. In another implementation, receiving the identifier 108 may be based on the next action 114. For example, assume the computing device 102 is currently logged into the target device 116, then the next state action 114 may include logging the computing device 102 out of the target device 116. Thus, it is assumed the credential 110 may already be validated at the target device 116. Implementations of the next action 114 include a set of instructions, instruction, process, operation, logic, algorithm, technique, logical function, firmware, and or software executable by the target device 116.

The processor 104 obtains the identifier 108 to select the credential 110 for transmission to the target device 116. Implementations of the processor 104 include a microchip, controller, chipset, microprocessor, semiconductor, microcontroller, central processing unit (CPU), graphics processing unit (GPU), visual processing unit (VPU), or other type of programmable device capable of receiving identifier 108 from the target device 116 and selecting the credential 110 associated with the identifier 108.

The identifier 108 is a data value which is unique to the target device 116 to identify the target device 116 to the computing device 102. Using the identifier 108 provides an additional authentication of the target device 116 to ensure it may be a trusted device. The target device 116 may include a storage component (not pictured) that includes the identifier for the processor 104 to retrieve and transmit to the computing device 102. Implementations of the identifier 108 include a hash value, key, data value, unique value, or other type of identifying information that is unique to the target device 116.

The credential 110 is a data value corresponding to the identifier 108, which authorizes the computing device 102 to the target device 116. For example, the credential 110 may include a near field communication tag and/or a user name and password for authorization to the target device 216. The credential 110 may include metadata corresponding to the identifier 108 for the processor 104 to identify for transmission to the target device 116. in one implementation, the credential 110 is selected from multiple credentials in which each credential corresponds to a different target device 116. This implementation ensures the appropriate credential is selected for transmission to the appropriate target device. In another implementation, the credential 110 is validated by the target device 116 as a mechanism to ensure the computing device 102 is authorized to communicate and perform various tasks on the target device 116. In a further implementation, the computing device 102 also transmits the next action 114 for the target device 116 to perform upon the validation of the selected credential 110.

The target device 116 includes the system state 1.12 and the identifier 108 for transmission to the computing device 102 across the near field communication link. Additionally, the target device 116 receives the selected credential 110 for validation. Upon validation of the credential 110, the target device 116 may perform the next action 114. The target device 116 may validate the selected credential 110 as a security mechanism to ensure the computing device 102 and/or user associated with the credential 110 are authorized for data exchange and/or communication. In another implementation, the target device 116 also receives the next action 114. The target device 116 may be similar to the computing device 102 in that the target device 116 is also capable of establishing near field communication links with other computing devices. As such implementations of the target device 116 include a client device, personal computer, desktop computer, laptop, a mobile device, or other type of electronic device suitable to transmit a system state 112 and identifier 108 and receive the selected credential 110.

Figure 2:
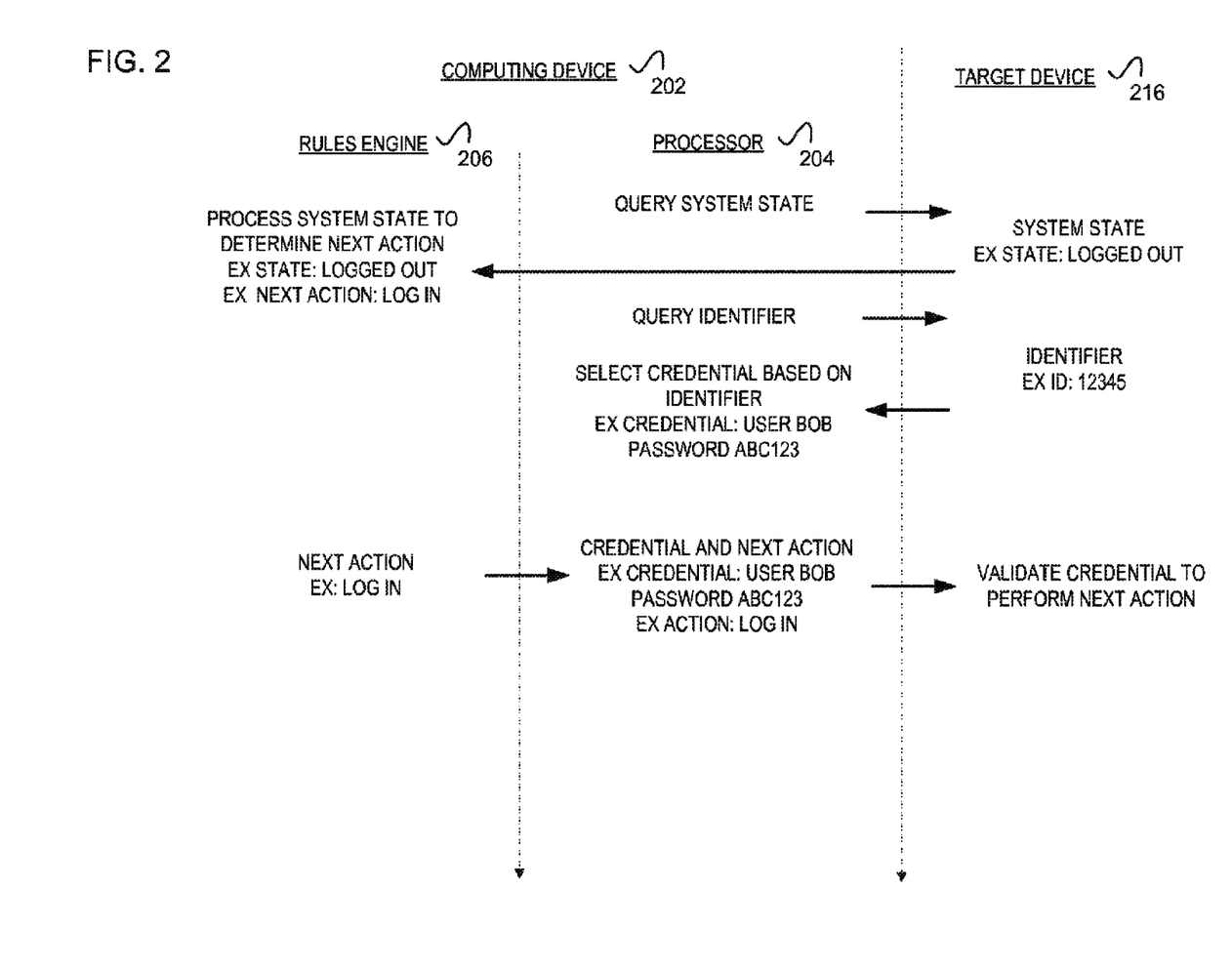
FIG. 2 is an example communication diagram between a computing device and a target device, the computing device including a rules engine and a processor.

FIG. 2 is a communication diagram between a computing device 202 and a target device 216. Specifically, the computing device 202 includes a processor 204 and rules engine 206 to communicate with the target device 216. The computing device 202, the processor 204, the rules engine 206, and the target device 216 may be similar in structure and functionality to the computing device 102, the processor 104, the rules engine 106, and the target device 116 as set forth in FIG. 1.

The processor 204 submits a query for a system state of the target device 216. In return, the target device 216 processes the query to obtain the system state of the target device 216 with respect to the computing device 202. The query is submitted to the target device 216 by bringing the computing device 202 and the target device 216 within close proximity of one another, thus establishing a near field communication link. In another implementation, the computing device 202 may receive the system state without submitting the query. An example of the system state in FIG. 2 may include the computing device 202 currently being logged out of the target device 216. This system state is transmitted to the rules engine 206.

The rules engine 206 processes the system state from the target device 216 to determine the next. action. For example, as in FIG. 2, assuming the system state includes the computing device 202 currently logged out of the target device 216, the example next action may include logging the computing device 202 into the target device 216. Logging in or out of the target device 216, as described herein, refers to authorizing the computing device 202 for communication, data exchange, and/or operations on the target device 216.

The processor 204 transmits a query for the identifier of the target device 216 based on the next action determined by the rules engine 206. The queries for the system state and the identifier may he transmitted separately or together. The target device 216 may then obtain the identifier to transmit to the processor 204. An example of the identifier as in FIG. 2 may include a value unique to the target device 216, thus enabling the target device 216 to identify itself to the computing device 202. Once obtaining the identifier, the processor 204 may select the credential. An example selected credential as in FIG. 2, includes a user name and/or password for transmission to the target device 216. This selected credential is specific to the target device 216 for validation. In a further implementation, the next action is transmitted from the rules engine 206 to the processor 204. In this implementation, the selected credential and the next action are transmitted to the target device 216.

Figure 3:
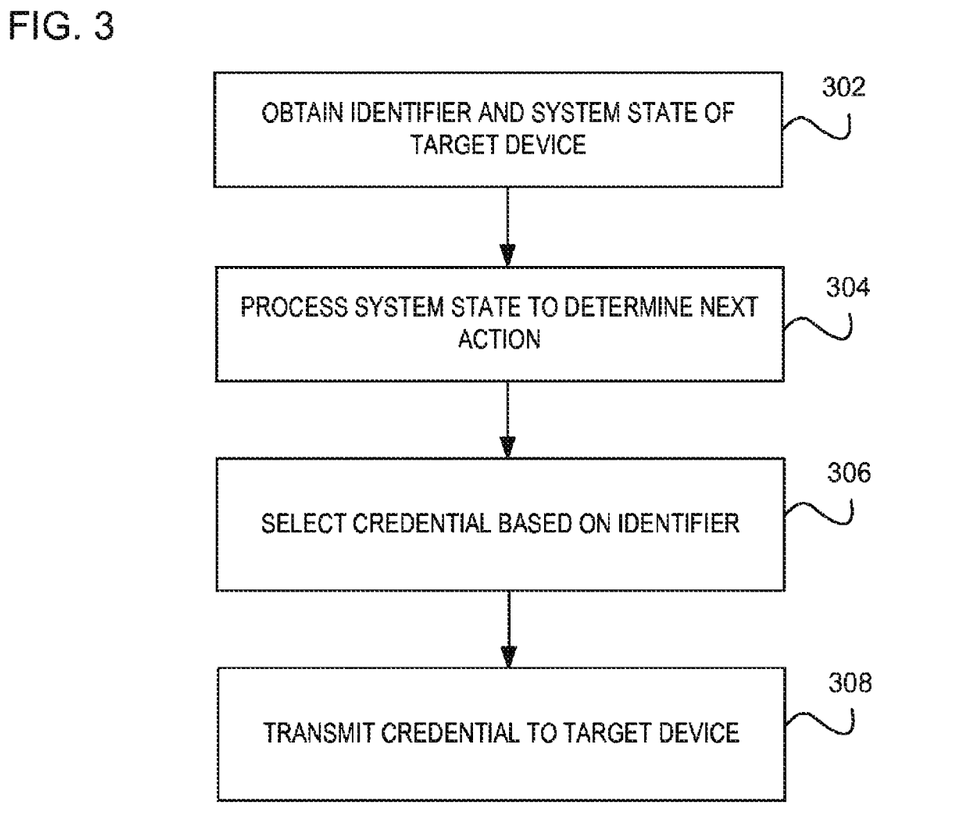
FIG. 3 is a flowchart of an example method to obtain an identifier and system state of a target device, process the system state to determine a next action for the target device, select a credential based on the identifier, and transmit the credential to the target device.

FIG. 3 is a flowchart of an example method to obtain an identifier and system state of a target device, process the system state to determine a. next action for the target device, select a credential based on the identifier, and transmit the credential to the target device, in discussing FIG. 3, reference may be made to the components in FIGS. 1-2 to provide contextual examples. Further, although FIG. 3 is described as implemented by computing device 102 and 202 as in FIGS. 1-2, it may be executed on other suitable components. For example, FIG. 3 may be implemented in the form of executable instructions on a machine-readable storage medium, such as machine-readable storage medium 504 as in FIG. 5.

At operation 302, the computing device obtains the identifier and the system state information. of the target device. Operation 302 includes initiating a near field communication link by the computing device to the target device, For example, the computing device may be in close proximity of the target device (e.g., a few centimeters) establishing the near field communication link. The computing device 102 may query the target device 116 for state information which identifies a status of the target device 116 with respect to the computing device 102. Obtaining the status of the target device with respect to the computing device, enables the given computing device to query whether it is currently logged into the target device as other computing devices may be logged into the target device. In one implementation, if the computing device is not already logged in (i.e., logged out), then the computing device may proceed with operations 304-308 to log into the target device. In another implementation, the computing device may query the target device for availability to pertbrm the next action. For example, the target device may include a printer and as such, the computing device queries to determine the availability of the printer to accept a data image transfer for printing. In a further implementation, the system state information is obtained and processed at operation 304 to determine the next action. Depending on the next action, the computing device may obtain the identifier to select the credential at operation 306.

At operation 304, the computing device processes the system state information obtained at operation 302 to determine a next action for the target device to perform. The computing device uses a rule engine to determine the next action. The rules engine is a model used to describe a set of states so when a given state (i.e., system state information) moves logically from one state to another state (i.e., next action). The rules engine may include a set of instructions, instruction, process, logic, algorithm, technique, logical function, firmware and/or software executable by the computing device to determine the next logical action based on the present status of the target device with respect to the computing device. In one implementation, based on the next action, the computing device then queries for the identifier of the target device. Obtaining the identifier of the target device enables the computing device select the appropriate credential for the target device to perform the next action.

At operation 306, the computing device selects a. credential associated with the identifier received at operation 302. The identifier is a unique data representation for the target device to identify itself to the computing device. The unique identifier may be associated with the credential so the computing device may recognize the unique identifier and select the corresponding credential. Selecting the corresponding credential may include a. type of data tag corresponding to the identifier and connected with the credential. The credential is a data value that is specific to the target device so when received by the target device, this data value may be validated fur security purposes. The credential may be selected among multiple credentials. The multiple credentials may either correspond to each user on the computing device or a single user which may interact with several different target devices. For example, in one implementation., the computing device may include a memory storing various credentials used for various target devices. In this implementation, the computing device may contain various credentials for a single user operating system that may be authorized to use several target devices. Additionally, this implementation may cover the situation the computing device may be operating with multiple users, where various users may he using the same computing device to establish communication with the target device. In this implementation, the target device may detect the user has multiple accounts and communicate with the computing device to ensure the appropriate credential is selected.

At operation 308, the computing device transmits the credential selected at operation 306 to the target device. The computing device may include a processor 104 as in FIG. 1 to select the credential at operation 306. The processor may transmit the credential to a near field communication chipset. The chipset may transmit the credential on an antenna to the target device. In another implementation, the computing device may also transmit the next action to the target device. The target device may perform the next state by validating the credential to identify the computing device to the target device.

Figure 4:
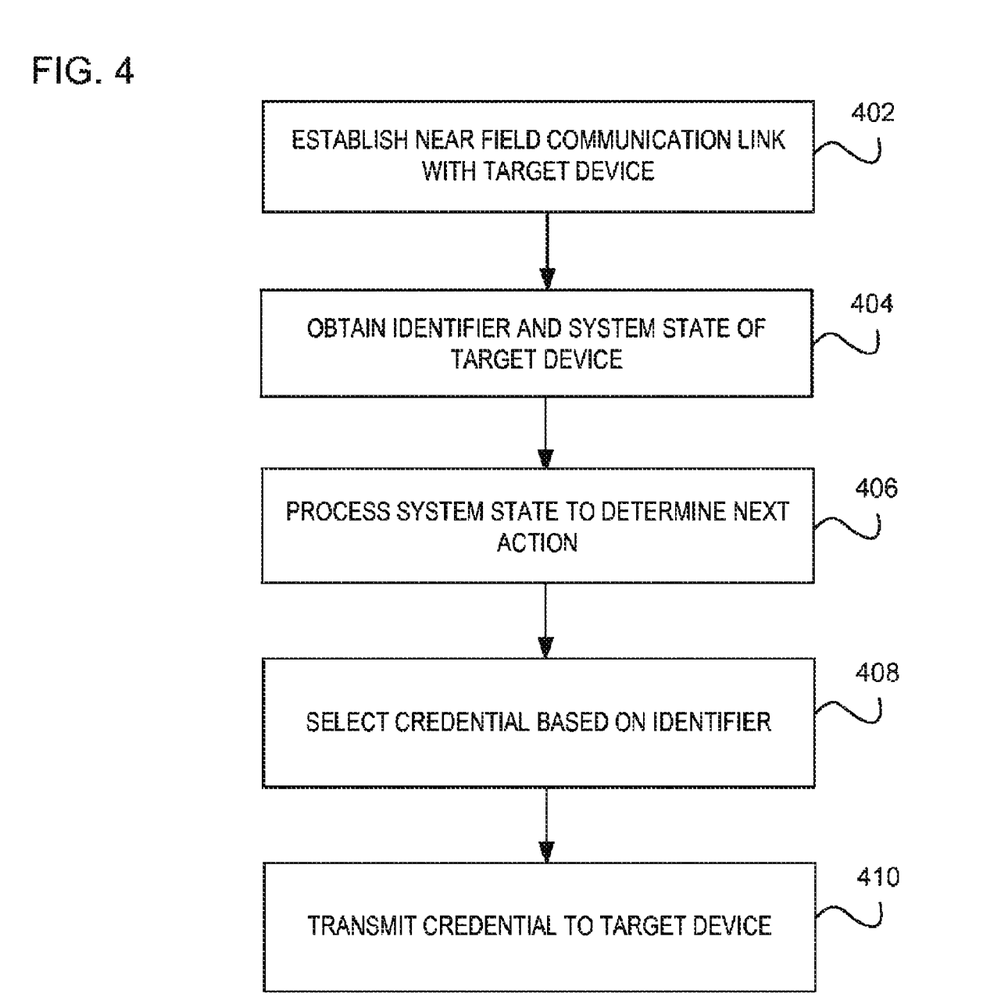
FIG. 4 is a flowchart of an example method to establish a near field communication link with a target device, obtain an identifier and system state of a target device, process the system state to determine a next action for the target device, select a credential based on the identifier, and transmit the credential to the target device.

FIG. 4 is a flowchart of an example method to establish a near field communication link with a target device, obtain an identifier and system state of a target device, process the system state to determine a next action for the target device, select a credential based on the identifier, and transmit the credential to the target device. In discussing FIG. 4, reference may be made to the components in FIGS. 1-2 to provide contextual examples. Further, although FIG. 4 is described as implemented by computing device 102 and 202 as in FIGS. 1-2, it may be executed on other suitable components. For example, FIG. 4 may be implemented in the form of executable instructions on a machine-readable storage medium, such as machine-readable storage medium 504 as in FIG. 5.

At operation 402, the computing device establishes a near field communication link with a target device. The near field communication link may be established by bringing the computing device and the target device within close proximity of one another. The close proximity may be within a few centimeters to establish communication. To establish this type of communication, the computing device and the target device may include a near field communication chipset and/or antenna. The communication may include contactless transactions, data exchange, and/or setting up more complex communications. The computing device may be powered on to receive the identifier and the system state at operation 404; however, the target device may be unpowered as the target device may include an unpowered near field communication tag to transmit the identifier and system state to the computing device.

At operation 404 the computing device obtains the identifier and the system state of the target device. In one implementation, the system state of the target device includes a current status of the computing device with respect to the target device. For example, this may include the computing device is currently logged out of the target device as at operation 406. In this example, the next logical state or action would be to log the computing device into the target device. A further example may include the availability of the target device to accept a data transfer from the computing device. In another implementation, the system state of the target device may include the computing device already being logged into the target device. In this implementation, the method would stop at operation 404 as it is assumed the credential was already transmitted to the target device and validated. Operation 404 may be similar in functionality as operation 302, set forth in FIG. 3.

At operation 406, the computing device processes the system state obtained at operation 406 to determine the next action. The system state is a present status of the target device with respect to the computing device. While the next action is considered a future state of the target device to perform with respect of the computing device. The next action is considered the next logical step for the target device to perform by validating the selected credential at operation 412. The computing device utilizes a rules engine or state model to determine this next logical step for the target device to perform. In this implementation, the input to the rules would be the system state and the output the next action. The rules engine may include a set of instructions, instruction, process, logic, algorithm, technique, logical function, firmware and/or software executable by the computing device to determine the next logical action. Operation 406 may be similar in functionality as operation 304, set forth in FIG. 3.

At operation 408, the computing device selects the credential based on the identifier obtained at operation 404. Operation 408 may be similar in functionality as operation 306, set forth in FIG. 3

At operation 410, the computing device transmits the credential to the target device. In another implementation, the computing device also transmits the next action to the target device so when the credential is validated, the target device may perbrm the next action. Operation 410 may be similar in functionality to operation 308, set forth in FIG. 3.

Figure 5:
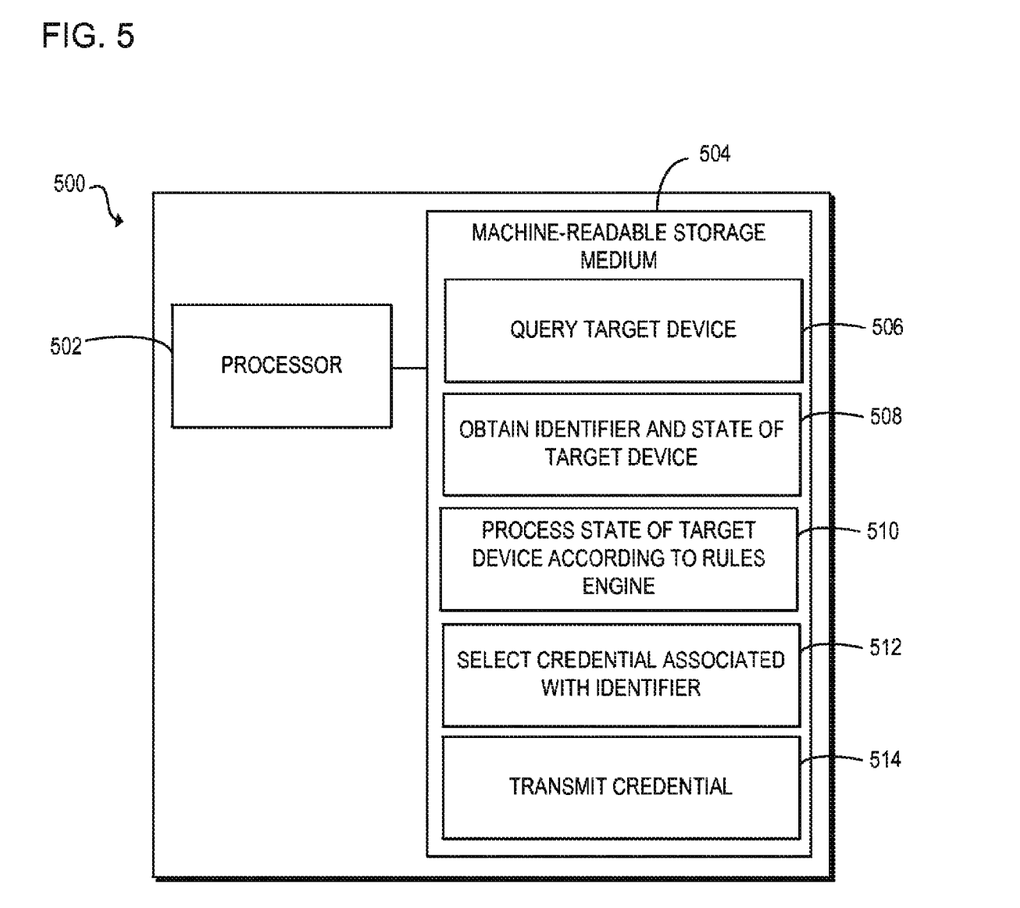
FIG. 5 is a block diagram of an example computing device with a processor to query a target device, obtain an identifier and state of the target device, process the state of the target device according to a rules engine, select a credential associated with the identifier for the target device, and transmit the selected credential to the target device.

FIG. 5 is a block diagram of example computing device 500 with a processor 502 to execute instructions 506-514 within a machine-readable storage medium 504. Specifically, the computing device 500 with the processor 502 executes instructions to query a target device, obtain an identifier and state of the target device, process the state of the target device according to a rules engine, select a credential associated with the identifier for the target device, and transmit the selected credential to the target device. Although the computing device 500 includes processor 502 and machine-readable storage medium 504, it may also include other components that would he suitable to one skilled in the art. For example, the computing device 500 may include rules engines 106 and 206 as in FIGS. 1-2. Additionally, the computing device 500 may be similar in structure and functionality of the computing devices 102 and 202 as set forth in FIG. 1 and FIG. 2, respectively.

The processor 502 may fetch, decode, and execute instructions 506-514 to select a credential based on the state of a target device. Specifically, the processor 502 executes: instructions 506 to query the target device for the state and/or identifier; instructions 508 to obtain the identifier and the state of the target device queried at instructions 506; instructions 510 to process the state of the target device according to the rules engine for determining a next action of the target device; instructions 512 to select a credential associated with the identifier received at instructions 508: and instructions 514 to transmit the credential to the target device. In one embodiment, the processor 502 may be similar in structure and functionality to the processor 104 and 204 as in FIGS. 1-2 to execute instructions 506-514. In other embodiments, the processor 502 includes a controller, microchip, chipset, electronic circuit, microprocessor, semiconductor, microcontroller, central processing unit (CPU), graphics processing unit (GPU), visual processing unit (VPU), or other programmable device capable of executing instructions 506-514.

The machine-readable storage medium 504 includes instructions 506-514 for the processor to fetch, decode, and execute. In another embodiment, the machine-readable storage medium 504 may be an electronic, magnetic, optical, memory, storage, flash-drive, or other physical device that contains or stores executable instructions. Thus, the machine-readable storage medium 504 may include, for example, Random Access Memory (RAM), an Electrically Erasable Programmable Read-Only Memory (EEPROM), a storage drive, a memory cache, network storage, a Compact Disc Read Only Memory (CDROM) and the like. As such, the machine-readable storage medium 504 may include an application and/or firmware which can be utilized. independently and/or in conjunction with the processor 502 to fetch, decode, and/or execute instructions of the machine-readable storage medium 504. The application and/or firmware may be stored on the machine-readable storage medium 504 and/or stored on another location of the computing device 500.

In summary, examples disclosed herein simplify the near field communication experience for a user by automatically selecting an appropriate credential for a given target device without user input. Additionally, the examples also manage multiple credentials corresponding to various target devices.

I claim:

1. A method comprising:
obtaining, at an initiating computing device, an identifier and system state from a target computing device to establish a near field communication link, wherein the system state includes a determination by the target computing device of whether the initiating computing device is logged in to the target computing device;
establishing the near field communication link between the initiating computing device and the target computing device;
processing the system state of the target computing device to determine a next action for the target computing device;
based on the next action for the target computing device, selecting the credential associated with the identifier of the target computing device; and transmitting the credential to the target computing device to perform the next action.

2. The method of claim 1 wherein the credential associated with the target computing device is selected among multiple credentials, each credential specific to a different target computing device.

3. The method of claim 1 wherein the system state includes whether the initiating computing device is logged out of the target computing device and the next action includes logging the initiating computing device into the target computing device based on a validation of the credential.

4. The method of claim 1 wherein the system state includes a state specific to the initiating computing device with regards to the target computing device.

5. The method of claim 1 wherein the target computing device performs the next action based on a validation of the credential.

6. A computing device comprising:
a processor to:
receive, at the computing device, an identifier and a system state from a target computing device to establish a near field communication link between the computing device and the target computing device, wherein the identifier identifies the target computing device to the computing device, wherein the system state includes a determination by the target computing device of whether the computing device is logged in to the target computing device; and
select a credential from multiple credentials based on the identifier of the target computing device for validation to the target device, each of the multiple credentials is specific to a different target computing device; and
receive a state of the target computing device indicating a current status of the computing device with respect to the target computing device; and
process the state of the target computing device for determination of a next state for the target computing device to perform.

7. The computing device of claim 6 wherein the next state for the target computing device to perform is based on the validation of the selected credential to the target computing device.

8. The computing device of claim 6 further comprising:
an antenna to transmit the selected credential to the target computing device to perform the next state.

9. The computing device of claim 6 wherein the states are each a different condition of the target computing device associated with the computing device.

10. A non-transitory machine-readable storage medium encoded with instructions executable by a processor of a computing device, the storage medium comprising instructions to:
obtain, at the computing device, an identifier and a state from a target computing device to establish a near field communication link between the computing device and the target computing device, wherein the system state includes a determination by the target computing device of whether the computing device is logged in to the target computing device, and wherein the computing device is allowed to perform a task on an operating system of the target computing device when logged in;
process the state of the target computing device according to a rules engine to determine a next state for the target computing device to perform;
select a credential from multiple credentials, the credential associated with the identifier of the target device; and
transmit the credential to the target computing device to perform the next state, wherein the next state includes a state specific to the target computing device based on validation of the credential at the target computing device.

11. The non-transitory machine-readable storage medium of claim 10 further comprising instructions to:
query the target computing device for both the state of the target computing device and the identifier of the target computing device.

12. The non-transitory machine-readable storage medium of claim 10 wherein the next state includes logging the computing device into the target computing device.

* * * * *